(12) United States Patent
Koh et al.

(10) Patent No.: US 8,465,870 B2
(45) Date of Patent: Jun. 18, 2013

(54) SECONDARY BATTERY WITH IMPROVED CAPACITY AND INSTALLATION CONVENIENCE

(75) Inventors: Seok Koh, Yongin-si (KR); Seokryun Park, Yongin-si (KR); Youngho Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 522 days.

(21) Appl. No.: 12/591,361

(22) Filed: Nov. 17, 2009

(65) Prior Publication Data

US 2010/0136422 A1    Jun. 3, 2010

(30) Foreign Application Priority Data

Dec. 3, 2008    (KR) .................. 10-2008-0121880

(51) Int. Cl.
*H01M 2/02*    (2006.01)

(52) U.S. Cl.
USPC ........... 429/170; 429/130; 429/138; 429/163; 429/175; 429/178; 429/186

(58) Field of Classification Search
USPC ................ 429/130, 138, 163, 167, 168, 169, 429/170, 175, 176, 177, 178
See application file for complete search history.

(56) References Cited

U.S. PATENT DOCUMENTS

| 2004/0126651 A1* | 7/2004 | Kim et al. | 429/61 |
| 2006/0093896 A1* | 5/2006 | Hong et al. | 429/61 |
| 2006/0244416 A1* | 11/2006 | Yong et al. | 320/112 |

FOREIGN PATENT DOCUMENTS

| JP | 08-329913 A | 12/1996 |
| JP | 2001-143672 A | 5/2001 |
| KR | 1020070075709 A | 7/2007 |
| KR | 1020070104688 A | 10/2007 |

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A secondary battery includes a bare cell having an electrode terminal and a cap plate, and a protective circuit module protecting the bare cell. The protective circuit module includes a first module positioned on an upper surface of the bare cell, a second module positioned on a lower surface of the bare cell and having a charge/discharge terminal, and a third module positioned on a side surface of the bare cell and electrically connecting the first module to the second module.

16 Claims, 9 Drawing Sheets

SECONDARY BATTERY WITH IMPROVED CAPACITY AND INSTALLATION CONVENIENCE

CLAIM FOR PRIORITY

This application makes reference to, incorporates the same herein, and claims all benefits accruing under 35 U.S.C. §119 from Korean Patent Application No. 10-2008-0121880 filed on Dec. 3, 2008 in the Korean Intellectual Property Office.

BACKGROUND OF THE INVENTION

1. Field of the Invention

The present invention relates to a secondary battery which is capable of achieving an increased capacity and improved installation convenience with external electronic equipment.

2. Description of the Related Art

A lithium ion secondary battery may include a core pack composed of a bare cell and a protective circuit module.

The bare cell is generally composed of a positive electrode plate, a negative electrode plate, an electrolyte and a separator. The bare cell serves as a power source for external electronic equipment, and is capable of repeated use after recharging thereof. The protective circuit module protects the secondary battery against overcharging and overcurrent, and prevents performance deterioration of the battery which may occur due to excessive discharge.

SUMMARY OF THE INVENTION

The present invention has been developed in view of problems experienced with secondary batteries of the prior art, and it is an object of the present invention to provide a secondary battery which is capable of achieving an increased capacity density and improved installation convenience with external electronic equipment.

The problems to be solved by the present invention are not limited to the technical problems as mentioned above, but include other technical problems not mentioned herein which would be apparent from the following description by a person having ordinary knowledge in the art to which the invention pertains.

In accordance with an embodiment of the present invention, the above and other objects can be accomplished by the provision of a secondary battery including a bare cell having an electrode terminal, and a cap plate, and a protective circuit module for protecting the bare cell, wherein the protective circuit module may include a first module positioned on an upper surface of the bare cell, a second module positioned on a lower surface of the bare cell and having a charge/discharge terminal, and a third module positioned on a side surface of the bare cell and electrically connecting the first module and the second module.

The first module positioned on the upper surface of the bare cell includes a first flexible printed circuit board, a positive temperature coefficient (PTC) region, a protective circuit device and a lead plate. The second module positioned on the lower surface of the bare cell includes a second flexible printed circuit board and a charge/discharge terminal. The third module connecting the first module and the second module is composed of a third flexible printed circuit board.

The secondary battery may further include a holder between a side surface of the bare cell and the third module, wherein a surface of the holder facing the third module is flat.

In accordance with another embodiment of the present invention, a secondary battery includes a bare cell having an electrode terminal and a cap plate, a protective circuit module for protecting the bare cell, and a holder positioned on a side surface of the bare cell, a first surface of the holder spaced apart from the barecell being flat. The protective circuit module may include a first module positioned on an upper surface of the bare cell and a second module positioned on the first surface of the holder and having a charge/discharge terminal.

The first module positioned on an upper surface of the bare cell may include a first flexible printed circuit board, a PTC region, a protective circuit device and a lead plate. The second module may include a second flexible printed circuit board and a charge/discharge terminal.

A surface of the holder facing a side surface of the bare cell may have a curvature which is identical to that of a side surface of the bare cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described in more detail with reference to accompanying drawings, such that those skilled in the art can easily practice the present invention. These and other objects, advantages and features of the present invention and methods of achieving the same will become apparent from the detailed embodiments given below which are made in conjunction with the following drawings. Like reference numbers refer to like elements throughout the specification and drawings.

Hereinafter, secondary batteries in accordance with various embodiments of the present invention will be described in more detail with reference to the accompanying drawings.

Figure 1:
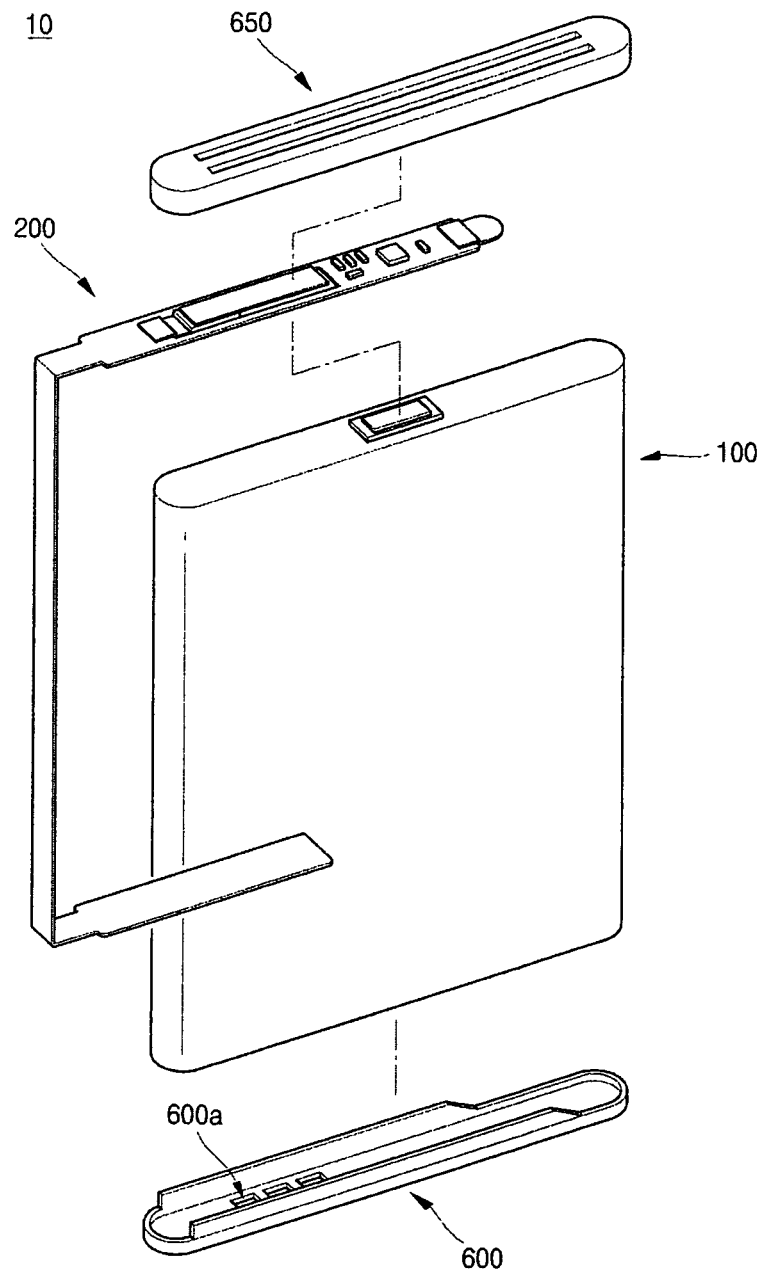
FIG. 1 is an exploded perspective view of a secondary battery in accordance with an embodiment of the present invention.
Figure 2:
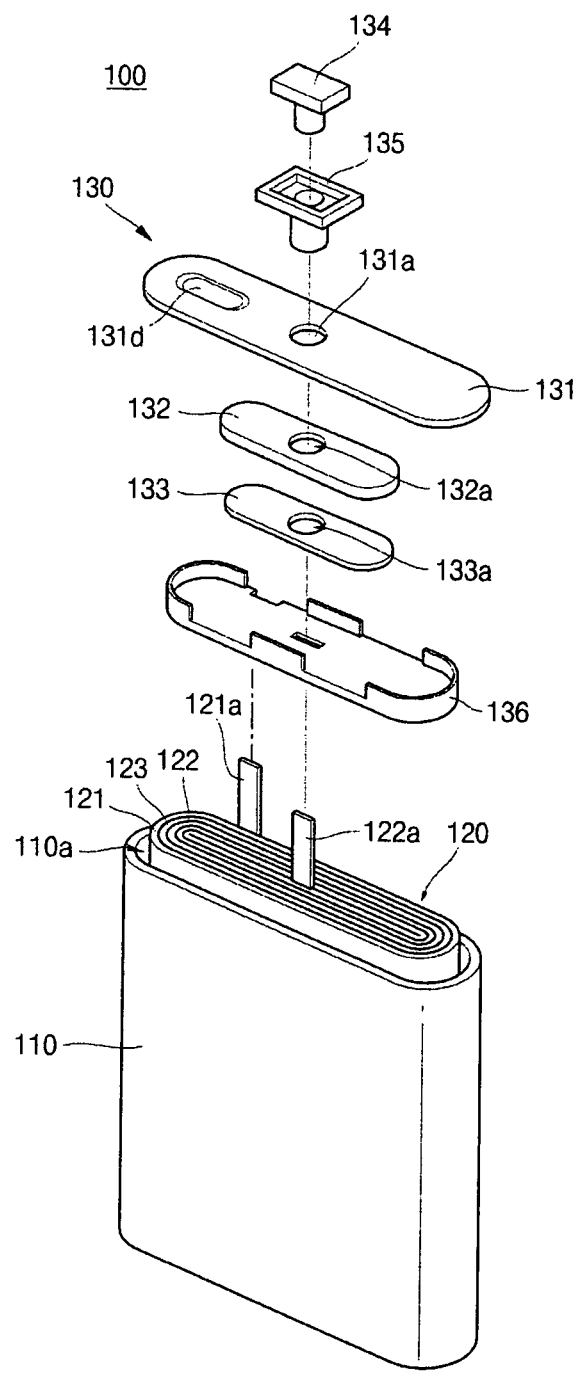
FIG. 2 is an exploded perspective view of a bare cell in accordance with an embodiment of the present invention.

FIG. 1 is an exploded perspective view of a secondary battery in accordance with an embodiment of the present invention, and FIG. 2 is an exploded perspective view of a bare cell in accordance with an embodiment of the present invention.

Referring to FIGS. 1 and 2, the secondary battery 10 may include a bare cell 100, a protective circuit module 200, an upper case 600, and a lower case 650.

The bare cell 100 may include a can 110, an electrode assembly 120 housed in the can 110, and a cap assembly 130 covering an open part 110a of the can 110.

The can 110 may be of a generally rectangular shape having the open part 110a at one side thereof. The can 110 may be formed of metal and may also serve as a terminal.

The electrode assembly 120 can be inserted into the can 110 through the open part 110a of the can 110. The electrode assembly 120 is fabricated by stacking a first electrode plate 121, a second electrode plate 122 and a separator 123 disposed therebetween, and winding the resulting stacked structure into a jelly roll shape. The electrode assembly 120 can supply electric power by repeated charge/discharge of the secondary battery 10. The first electrode plate 121 may be composed of a first electrode collector (not shown) and a first electrode coating portion (not shown).

The first electrode collector may be formed of aluminum (Al) foil having excellent conductivity when the first electrode plate 121 is a positive electrode.

The first electrode coating portion is positioned on the first electrode collector and may be composed of a first electrode active material, a conductive material and a binder. Examples of the first electrode active material may include lithium cobalt oxide ($LiCoO_2$), lithium manganese oxide ($LiMn_2O_4$), lithium nickel oxide ($LiNiO_2$), and the like. The conductive material may be carbon black or the like. As the binder, PVDF, SBR or PTFE may be used in the form of a solution or dispersion thereof in a volatile solvent (such as NMP) or in an organic solvent or water.

Both side ends of the first electrode collector may be provided with first electrode non-coating portions (not shown) where first electrode coating portions are not formed. A first electrode tab 121a is attached to the first electrode non-coating portion and protrudes toward the open part 110a of the can 110. The first electrode tab 121a may be formed of aluminum or the like. In order to prevent a possible short circuit with parts other than the can 110, a first insulating tape (not shown) may be provided on a portion where the first electrode tab 121a is drawn from the electrode assembly 120.

The second electrode plate 122 may be composed of a second electrode collector (not shown) and a second electrode coating portion (not shown).

The second electrode collector may be formed of copper (Cu) foil having excellent conductivity when the second electrode plate 122 is a negative electrode.

The second electrode coating portion is positioned on the second electrode collector, and may be composed of a second electrode active material, a conductive material and a binder. Examples of materials for the second electrode active material may include carbon (C)-based materials, Si, Sn, tin oxides, composite tin alloys, transition metal oxides, lithium metal nitrides, lithium metal oxides, and the like. Representatively, carbon (C)-based materials may be used for the second electrode active material. Examples of the conductive materials may include carbon black and the like. As the binder, PVDF, SBR or PTFE may be used by dissolving or dispersing it in a volatile solvent (such as NMP) or in an organic solvent or water. The second electrode plate 122 may not employ a conductive material due to high conductivity of the second electrode active material per se.

Both side ends of the second electrode collector may be provided with second electrode non-coating portions (not shown) where second electrode coating portions are not formed. A second electrode tab 122a is attached to the second electrode non-coating portion and protrudes toward the open upper part 110a of the can 110. The second electrode tab 122a may be formed of copper (Cu) or Nickel (Ni). In order to prevent a possible short circuit with parts other than an electrode terminal 134, a second insulating tape (not shown) may be provided on a portion where the second electrode tab 122a is drawn from the electrode assembly 120.

Although the above-mentioned configuration is illustrated with reference to a structure where the first electrode plate 121 is a positive electrode and the second electrode plate 122 is a negative electrode, an alternative form is possible wherein the first electrode plate 121 is a negative electrode and the second electrode plate 122 is a positive electrode.

Generally in a square-type secondary battery 10, the can 110 serving as a terminal may be a positive electrode. If the first electrode plate 121 is a positive electrode, the outermost electrode plate of a jelly-roll electrode assembly 120 may be the first electrode plate 121 which corresponds to the positive electrode. If the first electrode plate 121 is a negative electrode, the outermost electrode plate of a jelly-roll electrode assembly 120 may be the second electrode plate 122 which corresponds to the positive electrode.

Hereinafter, an embodiment will be illustrated wherein the first electrode plate 121 is a positive electrode and the second electrode plate 122 is a negative electrode.

The separator 123 may be disposed between the first electrode plate 121 and the second electrode plate 122. The separator 123 may be formed of a porous film using polyethylene (PE), polypropylene (PP) or a composite film thereof. The separator 123 serves to block electron conduction between the first electrode plate 121 and the second electrode plate 122 which may take place in the electrode assembly 120, and facilitates smooth migration of lithium ions. The separator 123 may prevent possible contact between the first electrode plate 121 and the second electrode plate 122, and may also prevent a rise in battery temperatures through the shut-down function or the like upon elevation of an internal temperature of the secondary battery 10 due to an external short circuit or the like. Furthermore, in order to prevent a short circuit between the first electrode plate 121 and the second electrode plate 122, a ceramic layer of a ceramic/binder mixture may be further formed in addition to installation of the separator 123.

In the electrode assembly 120, upon charging of the fabricated battery, lithium ions migrate into the second electrode plate 122 from the first electrode plate 121 (intercalation). In contrast, upon discharging, lithium ions migrate into the first electrode plate 121 from the second electrode plate 122 (deintercalation). As a result, electric power can be applied to external equipment via such a repeated intercalation/deintercalation process of lithium ions between the first electrode plate 121 and the second electrode plate 122.

The cap assembly 130 may include a cap plate 131, an insulating plate 132, a terminal plate 133, an electrode terminal 134, and a gasket 135. The cap assembly 130, in conjunction with a separate insulating case 136 positioned below the cap assembly 130, is combined into the electrode assembly 120 at the open part 110a of the can 110, thus resulting in hermetic sealing of the can 110. The insulating case 136 may be provided with a hole (not shown) for injection of an electrolyte into the electrode assembly 120.

The cap plate 131 is positioned in the open part 110a of the can 110, and may be formed of a metal plate having a size corresponding to the open part 110a of the can 110. At the center of the cap plate 131, a first hole 131a having a given size may be provided. One side of the cap plate 131 may be provided with an electrolyte injection hole (not shown). After injection of an electrolyte into the can 110 is complete, the electrolyte injection hole may be sealed with a plug (not shown). One side of the cap plate 131 opposite the electrolyte injection hole with respect to the first hole 131a may be provided with a safety vent 131d. The safety vent 131d has a given step with respect to the surrounding portion of the cap plate 131 due to formation of a groove on one surface of the cap plate 131. The safety vent 131d may be ruptured, resulting in external discharge of gases upon occurrence of high internal pressure in the bare cell 100. The cap plate 131 may be electrically connected to the first electrode tab 121a. Therefore, the cap plate 131 may have the same polarity as the first electrode plate 121.

The insulating plate 132 is plate-like and may be positioned below the cap plate 131. The insulating plate 132 may have a second hole 132a at a position corresponding to the position of the first hole 131a. The insulating plate 132 may be formed of the same insulating material as the gasket 135.

The terminal plate 133 is plate-like and may be positioned below the insulating plate 132. The terminal plate 133 may have a third hole 133a at a position corresponding to that of the second hole 132a. The terminal plate 133 may be formed of nickel or nickel alloy.

The electrode terminal 134 can be inserted into the cap plate 131, the insulating plate 132 and the terminal plate 133 through the first hole 131a, the second hole 132a and the third hole 133a. The electrode terminal 134 may be electrically connected to the second electrode tab 122a. Therefore, the electrode terminal 134 may have the same polarity as the second electrode plate 122.

The gasket 135 may be positioned between the electrode terminal 134 and the cap plate 131. The gasket 135 provides insulation between the electrode terminal 134 and the cap plate 131.

The protective circuit module 200 may be positioned on an upper surface of the bare cell 100. The protective circuit module 200 can provide protection of the secondary battery 10 against overcharge and overcurrent, and can prevent performance deterioration of the battery which may occur due to overdischarge.

Hereinafter, a connection structure between the protective circuit module 200 and the bare cell 100 will be illustrated with reference to FIGS. 3 thru 7.

Figure 3:
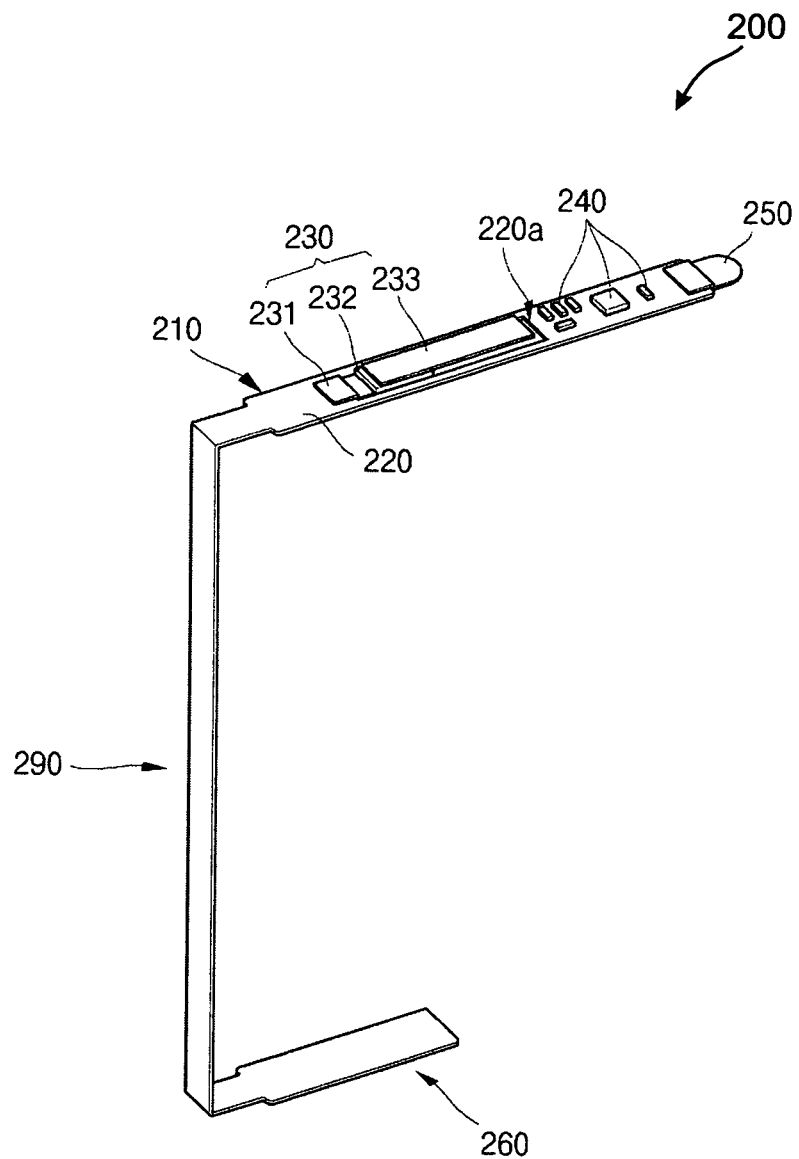
FIGS. 3 and 4 are perspective views of a protective circuit module in accordance with an embodiment of the present invention.
Figure 4:
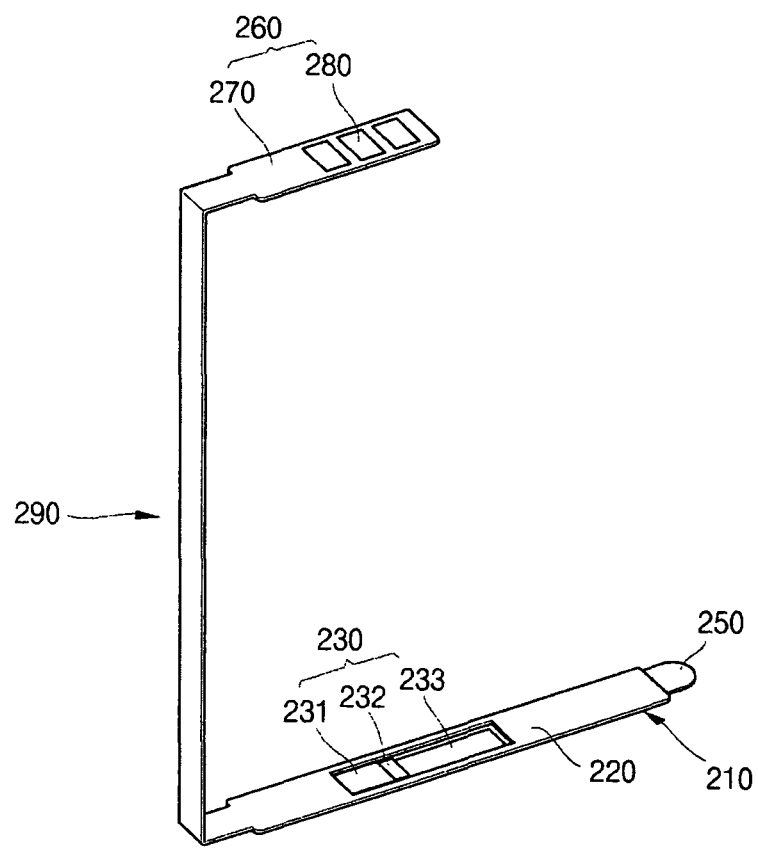
Figure 5:
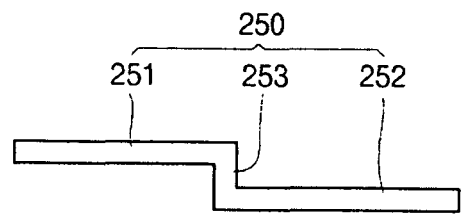
FIG. 5 is a perspective view of a lead plate in accordance with an embodiment of the present invention.
Figure 6:
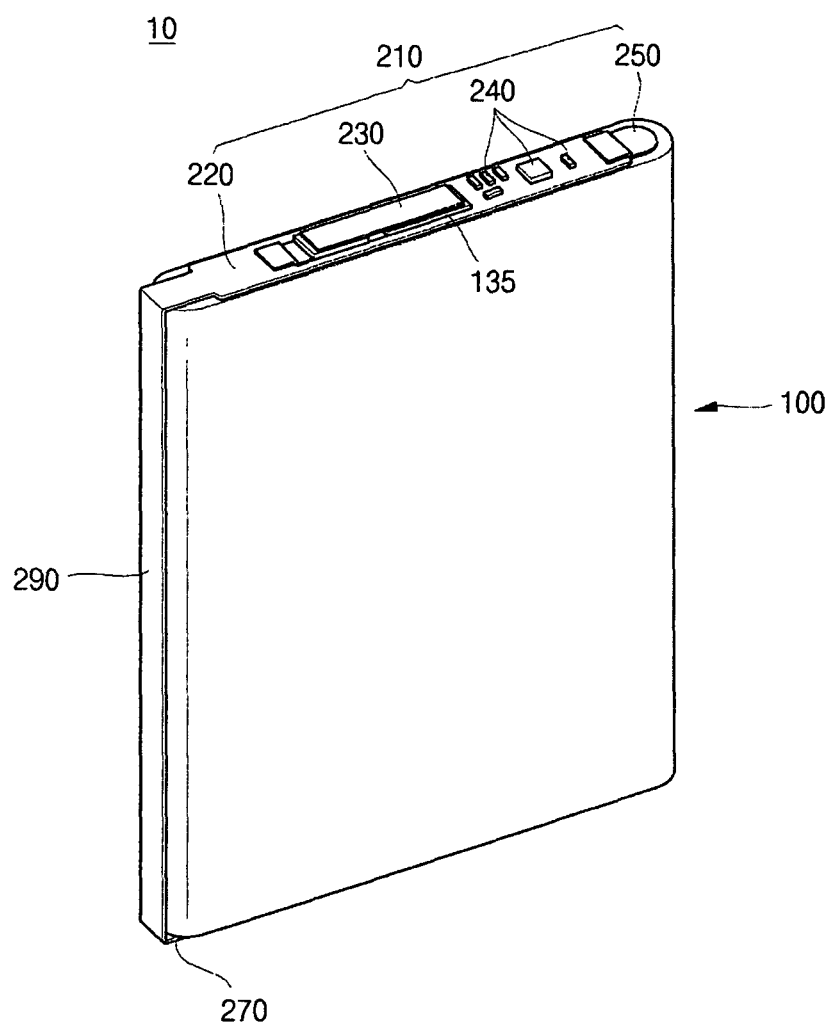
FIGS. 6 and 7 are perspective views of a secondary battery in accordance with another embodiment of the present invention.
Figure 7:
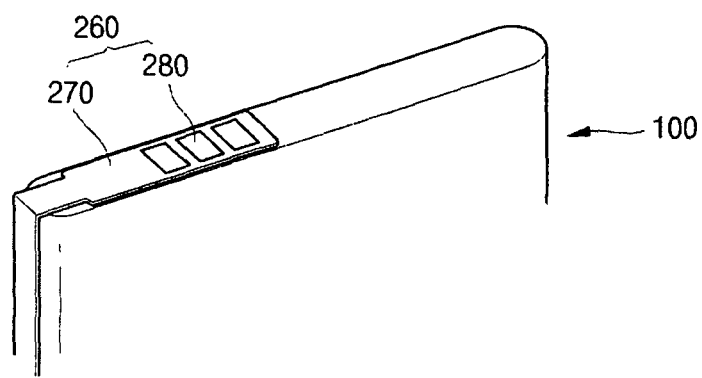

FIGS. 3 and 4 are perspective views of a protective circuit module in accordance with an embodiment of the present invention, FIG. 5 is a perspective view of a lead plate in accordance with an embodiment of the present invention, and FIGS. 6 and 7 are perspective views of a secondary battery in accordance with an embodiment of the present invention.

Referring to FIGS. 1 thru 4, the protective circuit module 200 may include a first module 210, a second module 260 and a third module 290. The first module 210 is positioned on an upper surface of the bare cell, the second module 260 is positioned on a lower surface of a bare cell, and the third module 290 is positioned on a side surface of the bare cell, so that the first module 210 and the second module 260 can be electrically and mechanically connected to each other. Therefore, the protective circuit module 200 may have a "=" shape.

The first module 210 may include a first flexible printed circuit board 220, a positive temperature coefficient (PTC) region 230, a protective circuit device 240 and a lead plate 250.

The first flexible printed circuit board 220 is formed so as to have a size corresponding to a portion of the cap plate 131 of the bare cell 100 with the exception of both opposite side regions having a curvature, and it may be of a rectangular shape. A terminal hole 220a may be formed at a position, in the first flexible printed circuit board 220, corresponding to the electrode terminal 134 of the bare cell 100. The electrode terminal 134 and the gasket 135 are inserted into the terminal hole 220a so that a lower surface of the first flexible printed circuit board 220 may be positioned in face-to-face contact with an upper surface of the bare cell 100, more specifically an upper surface of the cap plate 131. The protective circuit module of a conventional secondary battery has a space between the first module and the bare cell at least corresponding to protrusion of the electrode terminal upward from the bare cell, and is positioned on the bare cell. However, the protective circuit module 200 of an embodiment of the present invention enables fabrication of the secondary battery 10 having a more compact structure due to removal of the aforesaid space by face-to-face contact of the first flexible printed circuit board 220 with an upper surface of the bare cell 100. Therefore, it is possible to achieve miniaturization of the secondary battery 10. The aforesaid structure provides compact combination between the bare cell 100 and the protective circuit module 200 while maintaining battery capacity of the bare cell 100, so that capacity density (battery capacity/volume) of the secondary battery 10 can be increased.

The first flexible printed circuit board 220 is provided with a pattern of a conductive metal (not shown), and the conductive metal may be in electrical connection with the PTC region 230, the protective circuit device 240, the lead plate 250 and the third module 290. The first flexible printed circuit board 220 may have a thickness of 0.1 to 0.15 mm. This dimension is smaller as compared to the protective circuit module used in a conventional secondary battery, thereby reducing the size of the secondary battery 10 so that capacity density of the secondary battery 10 can be enhanced. Between the first flexible printed circuit board 220 and the bare cell 100, an insulating tape (not shown) may be disposed to provide insulation between the first flexible printed circuit board 220 and the cap plate 131. The insulating tape contains an adhesive material coated on both sides thereof, and can therefore provide adhesion of the first flexible printed circuit board 220 to the cap plate 131.

The PTC region 230 may be positioned on an upper surface of the first flexible printed circuit board 220. The PTC region 230 is composed of a first tab 231 in electrical connection with a terminal portion (not shown) formed on an upper surface of the first flexible printed circuit board 220, a PTC device 232 positioned on the first tab 231 and in electrical connection with the first tab 231, and a second tab 233 positioned on the PTC device 232 and in electrical connection with an electrode terminal 134 protruding through a terminal hole 220a. The second tab 233 can be firmly weld-attached to the electrode terminal 134 by, for example, laser welding. The PTC device 232 is a device which reaches almost an infinite magnitude of electrical resistance when battery temperature exceeds a certain critical value so that it can shut-off charge/discharge current when the secondary battery 10 is exposed to high temperature conditions. Since the PTC device 232 performs a reversible operation, the resistance of the PTC device 232 decreases again when the temperature of the secondary battery 10 drops after the PTC device 232 operates to shut-off electric current, and therefore the secondary battery 10 can commence its operation again. The PTC region 230 is electrically connected to the electrode terminal 134 of the bare cell 100, and therefore can function as a negative electrode lead plate 250.

The protective circuit device 240 may be provided at a position opposite the PTC region 230, as viewed from the terminal hole 220a of the first flexible printed circuit board 220. In the protective circuit device 240, numerous passive and active elements can be electrically connected to the conductive metal. The protective circuit device 240 can protect the battery by checking information such as charging/discharging state, current, voltage, and temperature of the secondary battery 10.

FIG. 5 is a perspective view of a lead plate in accordance with an embodiment of the present invention.

Referring to FIGS. 1 thru 5, the lead plate 250 is positioned on one side of the first flexible printed circuit board 220 and may be in electrical connection with the cap plate 131. As a result, the lead plate 250 may serve as a positive electrode lead plate 250. More specifically, the lead plate 250 may include a first plate 251 (FIG. 5) in electrical connection with one side of an upper surface of the first flexible printed circuit board 220 and having a flat plate shape, a second plate 252 in electrical connection with the cap plate 131 and having a flat plate shape, and a third plate 253 for providing electrical connection between the first plate 251 and the second plate 252. The first plate 251 may be soldered to the first flexible printed circuit board 220. Furthermore, the second plate 252 and the cap plate 131 can be more firmly weld-connected by, for example, laser welding. The third plate 253 may be formed so as to have a height which is approximately identical to a thickness of the first flexible printed circuit board 220.

The secondary battery 10 in accordance with an embodiment of the present invention may have a structure where the protective circuit module 200 is in face-to-face contact with an upper surface of the cap plate 131 and the first plate 251 is positioned on an upper surface of the protective circuit module 200. According to the aforesaid structure, the third plate 253 is also formed to have a height which is approximately identical to a thickness of the first flexible printed circuit board 220, and therefore the first lead plate 250 provides connection between the bare cell 100 and the protective circuit module 200. As a result, such a structure achieves removal of a space which was necessary for connection of the cap plate 131 and the lead plate 250, so that it is possible to fabricate a secondary battery 10 having a more compact structure, consequently resulting in miniaturization of the secondary battery 10. Furthermore, the aforesaid structure provides compact combination between the bare cell 100 and the protective circuit module 200 while maintaining battery capacity of the bare cell 100, so that capacity density (battery capacity/volume of secondary battery) of the secondary battery 10 can be increased.

The second module 260 (FIG. 4) may include a second flexible printed circuit board 270 and a charge/discharge terminal 280.

The second flexible printed circuit board 270 may be positioned on a lower surface of the bare cell 100. It is sufficient if the second flexible printed circuit board 270 has a size to form the charge/discharge terminal 280. The second flexible printed circuit board 270 may be positioned in face-to-face contact with the lower surface of the bare cell 100.

The second flexible printed circuit board 270 is also provided with a pattern of a conductive metal (not shown), and the conductive metal may be in electrical connection with the third module 290. The second flexible printed circuit board 270 may also have a thickness of 0.1 to 0.15 mm, as in the first flexible printed circuit board 220. This dimension is smaller as compared to the protective circuit module used in a conventional secondary battery, thereby reducing a size of the secondary battery 10, so that capacity density of the secondary battery 10 can be enhanced. Between the second flexible printed circuit board 270 and a surface of the bare cell 100, an insulating tape (not shown) may be further disposed to provide insulation between the second flexible printed circuit board 270 and the surface of the bare cell 100. The insulating tape contains an adhesive material coated on both sides thereof, and can therefore provide adhesion of the second flexible printed circuit board 270 to the surface of the bare cell 100.

The charge/discharge terminal 280 may be positioned on the second flexible printed circuit board 270. The charge/discharge terminal 280 is electrically connected to the conductive metal of the second flexible printed circuit board 270, and can serve as an electrical path for communication with external electronic equipment.

In a conventional secondary battery, only one surface of the bare cell is provided with a substrate as a base of the protective circuit module, and upper and lower surfaces of the substrate are provided with lead plates, charge/discharge terminals, PTC regions, and protective circuit devices. For installation of all these devices on one substrate, the bare cell and the substrate are inevitably spaced apart so as to have a space for formation of these devices. Such a space may be an obstacle to realization of a slim and compact structure of the secondary battery.

However, the secondary battery 10 in accordance with an embodiment of the present invention has a structure where the first flexible printed circuit board 220 having a thickness of 0.1 to 0.15 mm is in face-to-face contact with a surface of the bare cell 100, and devices constituting the protective circuit module 200 are disposed on an upper surface of the first flexible printed circuit board 220 (see FIG. 3). As a consequence, a slim and compact secondary battery 10 can be fabricated due to removal of the undesirable space which was conventionally formed between the bare cell and the protective circuit module. That is, the aforesaid structure enables compact combination between the bare cell 100 and the protective circuit module 200 while maintaining electric capacity of the bare cell 100, so that the volume of the secondary battery 10 can be decreased. As a consequence, this structure can lead to augmentation of capacity density (battery capacity/volume of secondary battery) of the secondary battery 10.

Depending on a connection structure of a power source between the secondary battery 10 and the external electronic equipment, the charge/discharge terminal 280 may be positioned on any side of the bare cell 100. Generally, the charge/discharge terminal 280 may be formed on the first flexible printed circuit board 220 of the protective circuit module 200 positioned on an upper surface of the bare cell 100 (see FIG. 4). However, in the present invention, the charge/discharge terminal 280 of the second module 260 may alternatively be positioned on a lower surface of the bare cell 100 so as to secure an installation space of the PTC region 230, the lead plate 250 and the protective circuit device 240 on the upper surface of the first flexible printed circuit board 220 (see FIG. 3).

For disposition of the charge/discharge terminal 280 on the lower surface of the bare cell 100, the third module 290 consisting of a third flexible printed circuit board may be positioned on a side surface of the bare cell 100. The third module 290 can provide electrical connection between the first module 210 and the second module 260. More specifically, the third flexible printed circuit board may be connected to the first flexible printed circuit board 220 and the second flexible printed circuit board 270. Furthermore, conductive metals of the first module 210 and the third module 290 can be in electrical connection with each other so that the PTC region 230, the lead plate 250, the charge/discharge terminal 280 and the protective circuit device 240 can be electrically connected to each other. In this connection, the third module 290 may be composed only of a third flexible printed circuit board, and therefore reference numeral 290 may refer to both the third module and the third flexible printed circuit board. Between the third module 290 and a side surface of the bare cell 100, an insulating tape may be further disposed.

When the charge/discharge terminal 280 of the second module 260 is positioned on a lower surface of the bare cell 100 (see FIG. 3), the upper case 600 (see FIG. 1) is positioned to cover both the lower surface of the bare cell 100 and the second module 260, and a lower case 650 is positioned to cover an upper surface of the bare cell 100 and the first module 210. Due to such a configuration, a lower part of the bare cell 100 may become an upper part of the secondary battery 10, whereas an upper part of the bare cell 100 may become a lower part of the secondary battery 10. A charge/discharge terminal hole 600a of the upper case 600 can expose the charge/discharge terminal 280 to the outside.

According to the above embodiment of the present invention, the secondary battery 10 can achieve a slim and compact structure to thereby increase capacity density of the battery, and can also achieve improved installation convenience with external electronic equipment through varied positioning of the charge/discharge terminal 280.

Figure 8:
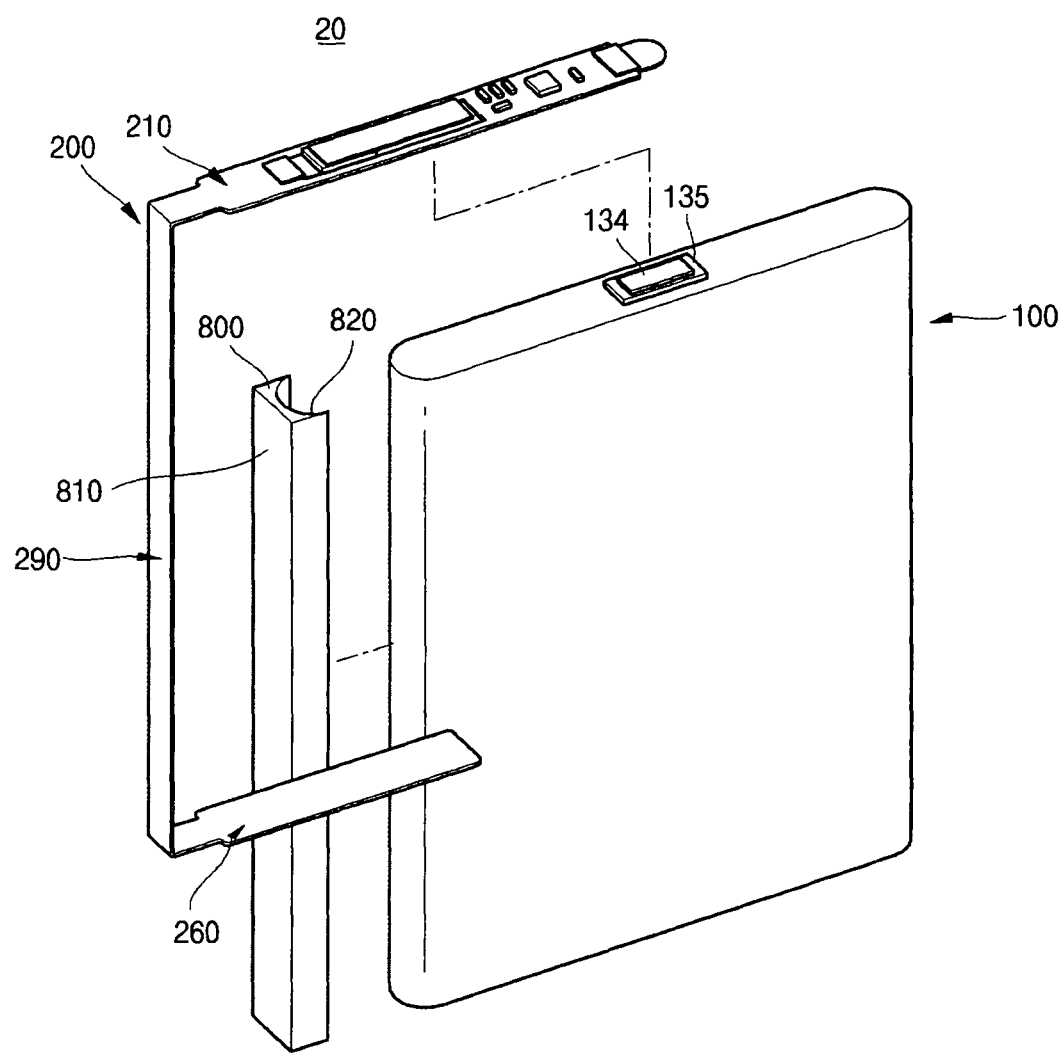
FIG. 8 is an exploded perspective view of a secondary battery in accordance with another embodiment of the present invention.

FIG. 8 is an exploded perspective view of a secondary battery in accordance with another embodiment of the present invention.

Referring to FIG. 8, the secondary battery 20 may include a bare cell 100, a protective circuit module 200 and a holder 800. Although not shown, it should be understood that the secondary battery 20 may further include an upper case and a lower case. The bare cell 100 and protective circuit module 200 of the secondary battery 20 have the same structure as the bare cell 100 and the protective circuit module 200 of the embodiments of the present invention shown in FIGS. 1 thru 7 discussed above. Therefore, differences with respect to the previous embodiments of the present invention will be mainly illustrated hereinafter.

The secondary battery 20 may include a holder 800 disposed between the third module 290 and a side surface of the bare cell 100. The holder 800 can make a side surface of the bare cell 100, more specifically, a curvature portion of a side surface of the can 110, flat. The holder 800 can be defined as having a first surface 810 facing the third module 290 and a second surface 820 facing a side surface of the can 110.

In the holder 800, the first surface 810 facing the third module 290 may have a flat shape for accommodating the third module 290 therein. On the other hand, the second surface 820 facing the side surface of the bare cell 100 may be formed so as to have a curvature conforming to a side surface of the bare cell 100. That is, the second surface 820 of the holder 800 engages a side surface of the bare cell 100 without leaving a space therebetween, and the third module 290 can be placed without being bent on the flat surface 810 of the flat holder 800.

Therefore, the secondary battery 20 may have a stable structure, whereby the holder 800 stably supports the third module 290.

Figure 9:
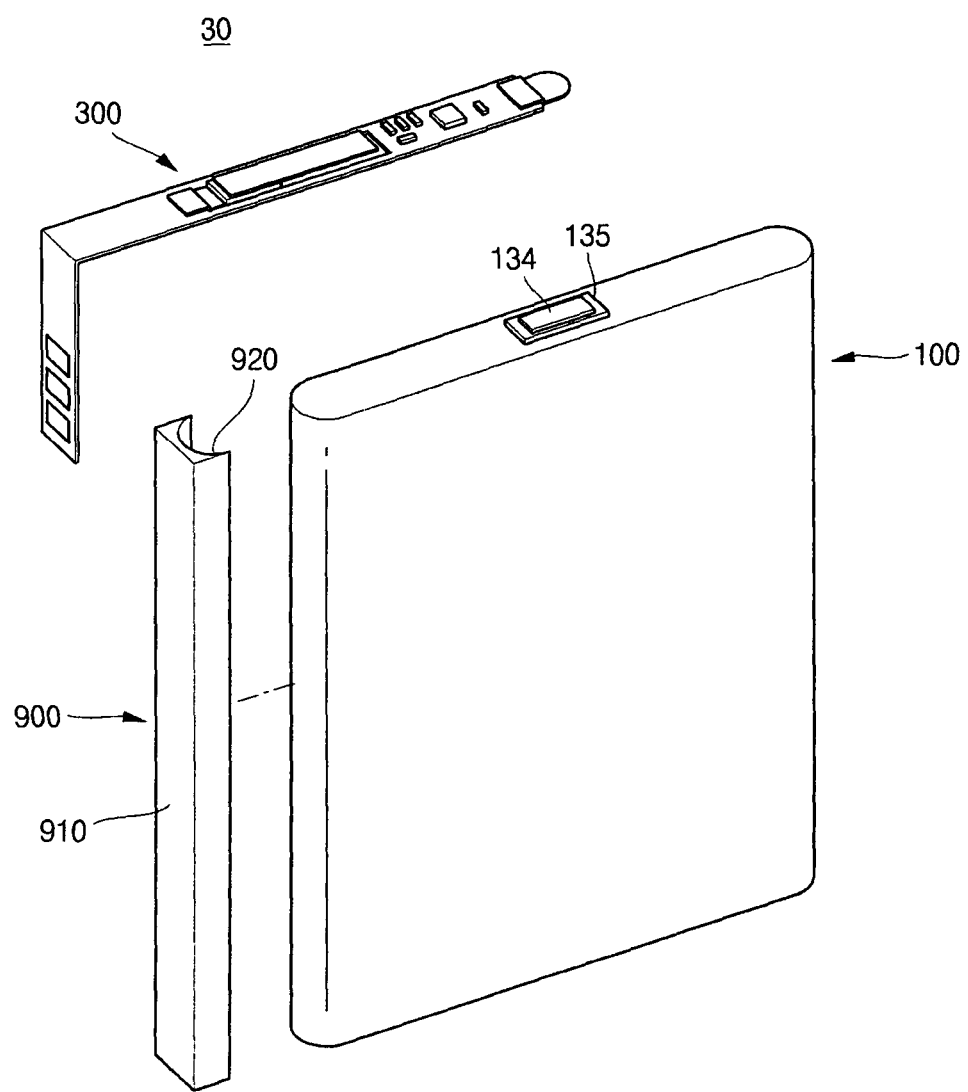
FIG. 9 is an exploded perspective view of a secondary battery in accordance with another embodiment of the present invention.
Figure 10:
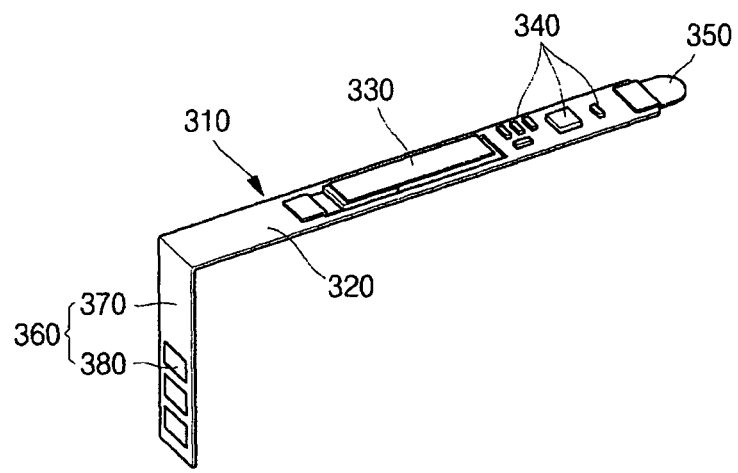
FIG. 10 is a perspective view of a protective circuit module in accordance with another embodiment of the present invention.
Figure 11:
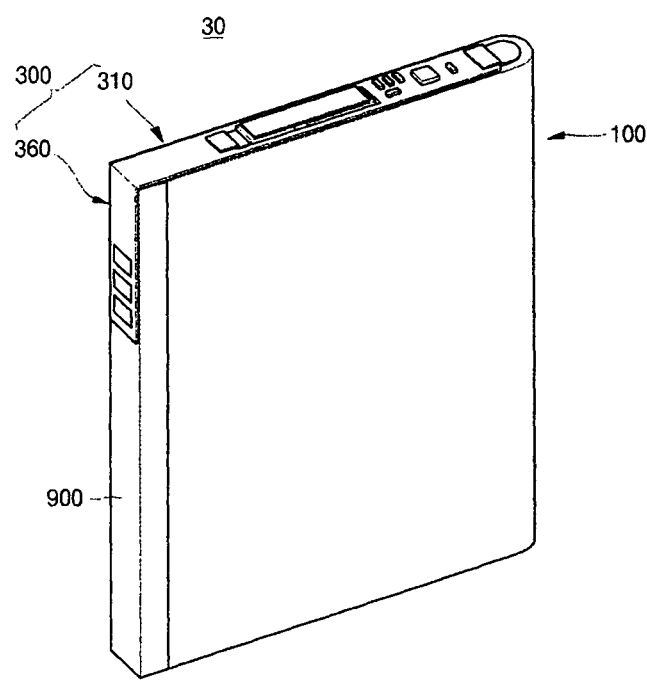
FIG. 11 is a perspective view of a secondary battery in accordance with another embodiment of the present invention.

FIG. 9 is an exploded perspective view of a secondary battery in accordance with another embodiment of the present invention, FIG. 10 is a perspective view of a protective circuit module in accordance with another embodiment of the present invention, and FIG. 11 is a perspective view of a secondary battery in accordance with another embodiment of the present invention.

Referring to FIGS. 9 thru 11, the secondary battery 30 may include a bare cell 100, a protective circuit module 300 and a holder 900. Although not shown, it should be understood that the secondary battery 30 may further include an upper case and a lower case. The bare cell 100 of the secondary battery 30 has the same structure and function as the secondary battery 10 previously discussed.

The protective circuit module 300 (see FIG. 10) may include a first module 310 and a second module 350. The first module 310 is positioned on an upper surface of the bare cell and the second module 350 is positioned on a side surface of the bare cell, so that the protective circuit module 300 has an "L" shape.

The first module 310 may include a first flexible printed circuit board 320, a positive temperature coefficient (PTC) region 330, a protective circuit device 340 and a lead plate 350. An insulating tape (not shown) can be further positioned between an upper surface of the bare cell 100 and the first module 310. The first module 310 also has the same structure and function as the first module 210 in accordance with the previous embodiment of the present invention.

The second module 360 may include a second flexible printed circuit board 370 and a charge/discharge terminal 380. The second flexible printed circuit board 370 is positioned on a side surface of the bare cell 100, and it is sufficient that the second flexible printed circuit board 370 has a size to form the charge/discharge terminal 380. The second flexible printed circuit board 370 have also provided with a pattern of a conductive metal (not shown), and the conductive metal may be in electrical connection with the conductive metal of the first flexible printed circuit board 320 and the charge/discharge terminal 380. The second flexible printed circuit board 370 may also have a thickness of 0.1 to 0.15 mm, as in the first flexible printed circuit board 320. This dimension is smaller as compared to the protective circuit module used in a conventional secondary battery, thereby reducing the size of the secondary battery 10 so that capacity density of the secondary battery 10 can be enhanced. The charge/discharge terminal 380 may be positioned on the second flexible printed circuit board 370. The charge/discharge terminal 380 is electrically connected to the conductive metal of the second flexible printed circuit board 370, and can serve as an electrical path for communication with external electronic equipment.

The second module 360 may be in electrical connection with the first module 310. More specifically, the first flexible printed circuit board 320 may be electrically connected to the second flexible printed circuit board 370. Furthermore, conductive metals of the first module 310 and the second module 360 can be in electrical connection with each other so that the PTC region 330, the lead plate 350, the charge/discharge terminal 380 and the protective circuit device 340 can be electrically connected to each other.

The holder 900 (FIG. 9) may be positioned between the second module 360 (FIG. 10) and a side surface of the bare cell 100 (FIG. 9). The holder 900 can make a side surface of the bare cell 100, more specifically, a curvature portion of a side surface of the can 110, flat. The holder 800 can be defined as having a first surface 910 facing the second module 360 and a second surface 920 facing a side surface of the can 110. Between the holder 900 and the side surface of the can 110 an insulating tape may be further provided.

In the holder 900, the first surface 910 (FIG. 9) faces the second module 360 (FIG. 1) and has a flat shape for accommodating the second module 360 therein. On the other hand, the second surface 920 (FIG. 9) facing a side surface of the bare cell 100 may be formed so as to have a curvature conforming to a side surface of the bare cell 100. That is, the second surface 920 of the holder 900 engages a side surface of the bare cell 100 without formation of a space therebetween, and the second module 360 (FIG. 10) can be placed on the first surface 910 of the flat holder 900 without being bent. Therefore, the secondary battery 30 can have a stable structure, whereby the holder 900 stably supports the second module 360.

According to another embodiment of the present invention as described above, the secondary battery 30 can achieve a slim and compact structure so as to thereby increase capacity density of the battery, and also improved installation convenience with external electronic equipment through varied positioning of the charge/discharge terminal 380.

As is apparent from the above description, a secondary battery in accordance with embodiments of the present invention can be miniaturized with size reduction of internal devices and compact positioning of internal devices. As a consequence, capacity density of the secondary battery can be increased by maintaining battery capacity while reducing the volume of the secondary battery.

Furthermore, installation convenience with external electronic equipment can be improved through varied positioning of a charge/discharge terminal.

Although preferred embodiments of the present invention have been described with reference to the attached drawings, those skilled in the art will appreciate that various modifications, additions and substitutions are possible without departing from the scope and spirit of the invention as disclosed in the accompanying claims.

It should be understood that the embodiments and the accompanying drawings have been disclosed for illustrative purposes only and the present invention is limited only by the following claims. Furthermore, it is to be understood that various modifications, additions and substitutions which can be derived from the equivalent concepts of the accompanying claims and drawings fall within the scope of the present invention.

What is claimed is:

1. A secondary battery, comprising:
a bare cell having an electrode terminal and a cap plate; and
a protective circuit module protecting the bare cell;
wherein the protective circuit module includes:
a first module positioned on an upper surface of the bare cell;
a second module positioned on a lower surface of the bare cell and having a charge/discharge terminal; and
a third module positioned on a side surface of the bare cell and electrically connecting the first module and the second module;
wherein the second module includes a second flexible printed circuit board positioned in contact with the lower surface of the bare cell, and the charge/discharge terminal is positioned on the second flexible printed circuit board.

2. The secondary battery according to claim 1, wherein the first module includes:
a first flexible printed circuit board positioned in contact with the upper surface of the bare cell and having a terminal hole formed at a position corresponding to the electrode terminal for insertion of the electrode terminal into the terminal hole;
a positive temperature coefficient (PTC) region positioned on an upper surface of the first flexible printed circuit board and electrically connected to the electrode terminal;
a lead plate positioned on one side of the upper surface of the first flexible printed circuit board and electrically connected to the cap plate; and
a protective circuit device positioned on the upper surface of the first flexible printed circuit board.

3. The secondary battery according to claim 1, wherein the third module comprises a third flexible printed circuit board positioned in contact with the side surface of the bare cell.

4. The secondary battery according to claim 1, wherein the protective circuit module has a rectangular "C" shape.

5. The secondary battery according to claim 1, further comprising an insulating tape positioned between the bare cell and the protective circuit module.

6. The secondary battery according to claim 1, further comprising a holder positioned between the side surface of the bare cell and the third module, wherein a first surface of the holder facing the third module is flat.

7. The secondary battery according to claim 6, wherein a second surface of the holder facing the side surface of the bare cell has a curvature which is substantially identical to a curvature of the side surface of the bare cell.

8. The secondary battery according to claim 1, further comprising a lower case positioned on the first module and an upper case positioned on the second module.

9. A secondary battery, comprising:
a bare cell having an electrode terminal and a cap plate;
a protective circuit module for protecting the bare cell, the protective circuit module including a first module positioned on an upper surface of the bare cell and a second module positioned on a side surface of the bare cell and having a charge/discharge terminal; and
a holder disposed between the second module and the side surface of the bare cell for entirely covering the side surface of the bare cell, wherein a first surface of the holder spaced apart from the bare cell is flat.

10. The secondary battery according to claim 9, wherein the first module includes:
a first flexible printed circuit board positioned in contact with the upper surface of the bare cell and having a terminal hole formed at a position corresponding to the electrode terminal for insertion of the electrode terminal into the terminal hole;
a PTC region positioned on an upper surface of the first flexible printed circuit board and electrically connected to the electrode terminal;
a lead plate positioned on one side of the upper surface of the first flexible printed circuit board and electrically connected to the cap plate; and
a protective circuit device positioned on the upper surface of the first flexible printed circuit board.

11. The secondary battery according to claim 9, wherein the second module includes a second flexible printed circuit board positioned in contact with the first surface of the holder, and the charge/discharge terminal is positioned on the second flexible printed circuit board.

12. The secondary battery according to claim 9, wherein the protective circuit module has an "L" shape.

13. The secondary battery according to claim 9, wherein a second surface of the holder facing the side surface of the bare cell has a curvature which is substantially identical to a curvature of the side surface of the bare cell.

14. The secondary battery according to claim 9, further comprising an insulating tape positioned between the upper surface of the bare cell and the first module.

15. A secondary battery, comprising:
a bare cell having an electrode terminal and a cap plate; and
a protective circuit module protecting the bare cell;

wherein the protective circuit module includes:
a first module positioned on an upper surface of the bare cell;
a second module positioned on a lower surface of the bare cell and having a charge/discharge terminal; and
a third module positioned on a side surface of the bare cell and electrically connecting the first module and the second module;
said secondary battery further comprising a holder positioned between the side surface of the bare cell and the third module for entirely covering the side surface of the bare cell, wherein a first surface of the holder facing the third module is flat.

16. The secondary battery according to claim 15, wherein a second surface of the holder facing the side surface of the bare cell has a curvature which is substantially identical to a curvature of the side surface of the bare cell.

* * * * *